United States Patent [19]
Arai

[11] Patent Number: 4,959,339
[45] Date of Patent: Sep. 25, 1990

[54] HEAT-RESISTANT NOBLE METAL CATALYST AND METHOD OF PRODUCING THE SAME

[75] Inventor: Hiromichi Arai, Fukuoka, Japan

[73] Assignee: Catalysts and Chemicals Inc., Tokyo, Japan

[21] Appl. No.: 336,218

[22] Filed: Apr. 11, 1989

[30] Foreign Application Priority Data

Apr. 13, 1988 [JP] Japan .................................. 63-88910

[51] Int. Cl.$^5$ ......................... B01J 21/04; B01J 23/10; B01J 23/58; B01J 23/64
[52] U.S. Cl. .................... 502/302; 502/303; 502/304; 502/306; 502/324; 502/327; 502/328; 502/341
[58] Field of Search .............. 502/303, 304, 306, 324, 502/327, 328, 302, 341; 423/213.5

[56] References Cited

U.S. PATENT DOCUMENTS

| | | | |
|---|---|---|---|
| 4,001,143 | 1/1977 | McCann | 252/462 |
| 4,183,829 | 1/1980 | Adachi | 252/466 G |
| 4,248,741 | 2/1981 | Wernli | 252/463 |
| 4,711,872 | 12/1987 | Kato et al. | 502/328 |

FOREIGN PATENT DOCUMENTS

| | | |
|---|---|---|
| 0270203 | 6/1986 | European Pat. Off. |
| 0222471 | 5/1987 | European Pat. Off. |
| 2082838 | 11/1971 | France . |
| 2168502 | 8/1973 | France . |
| 2168503 | 8/1973 | France . |

*Primary Examiner*—W. J. Shine
*Attorney, Agent, or Firm*—Ladas & Parry

[57] ABSTRACT

A heat-resistant noble metal catalyst having both of exceedingly superior heat-resistant property and a remarkable high activity at any temperature ranges of low, middle, and high, is provided having a heat-resistant noble metal catalyst consisting essentially of a composition having a formula $A_{1-z}C_zB_xD_uAl_{12-y-u}O_{19-\alpha}$, wherein A is at least one element selected from the group consisting of Ba, Ca and Sr, C is at least one element selected from the group consisting of K, Rb and rare earth elements, B is at least one element selected from the group consisting of Mn, Co, Fe, Ni, Cu and Cr, D is at least one element selected from the group consisting of Au, Ag and platinum group noble metals, z is a value in a range of 0-about 0.4, x is a value in a range of 0-about 4, y is a value in a range of x-2x, u is a value of not less than about 0.01, x+u is a value of not more than about 4, and $\alpha$ is a value which is determined by the values X, Y, Z and U of the respective elements, A, C, B and D and the values of x, y, z and u and is expressed as $$\alpha = 1 - \tfrac{1}{2}\{X - z(X-Y) + xZ + uU - 3y - 3u\}.$$

A method of producing such a catalyst is also provided.

14 Claims, No Drawings

HEAT-RESISTANT NOBLE METAL CATALYST AND METHOD OF PRODUCING THE SAME

Background of the Invention

1. Field of the Invention

The present invention relates to a heat-resistant noble metal catalyst, and more particularly to a heat-resistant and high activity noble metal catalyst for use in catalytic reactions, such as catalytic combustion, etc., and a method of producing the same.

2. Related Art Statement

Noble metal catalysts for catalytic combustion are widely used nowadays for abatement of carbon monoxide, nitrogen oxides, and hydrocarbons in exhaust gases from automobiles, for removal of noxious gases in exhaust gases from factories, for deodorization and for non-flame combustion, etc. However, as most of the catalysts have not enough heat-resistance, they are used under special consideration to avoid decrease of the catalyst activity by limiting or controlling operating temperature of the catalyst to a temperature lower than about 800° C. Under these circumstances, development of a noble metal catalyst of a much better heat-resistant property has been earnestly desired. Further, catalytic combustions at higher temperatures are of interest in many fields, such as gas turbines, boilers, and jet engines. Therefore, appearance of a remarkably heat-resistant and high activity catalyst capable of keeping its high activity even at an extremely high temperature, for example, at a temperature higher than 1,200° C., has been earnestly desired.

In general, a heat-resistant catalyst can be produced by supporting catalyst materials on a heat resistant catalyst carrier. From this point of view, the inventors have made extensive studies to develop heat-resistant compositions having better heat-resistant properties on the basis of an alumina carrier which has the most heat-resistant properties among the catalyst carriers being used widely at present, and as the result of the studies, the inventors showed that a composition consisting essentially of $MeO \cdot 6Al_2O_3$ (Me being Ca and/or Ba and/or Sr) can be a catalyst carrier having especially superior heat-resistant properties.

Further, the inventors showed in their U.S. Pat. No. 4,771,028 that the above mentioned composition consisting essentially of $MeO \cdot 6Al_2O_3$ becomes more heat-resistant when it is produced from a complex or mixed alkoxide of aluminum and a metal shown as Me. In this patent, the production method of the same are also proposed.

The inventors proposed also in their U.S. Pat. No. 4,788,174 a heat-resistant catalyst composition of a formula of $AB_xAl_{12-y}O_{19-\alpha}$ (A is the same with Me and expressed as Ca and/or Ba and/or Sr) which is a partial substitution of Al site of the above $MeO \cdot 6Al_2O_3$ composition by an active metal B (B is at least one element selected from Mn, Co, Fe, Ni, Cu and Cr), and proposed in their aforedescribed U.S. Pat. No. 4,788,174 and Japanese Patent Application No. 63-35,325 a heat-resistant catalyst composition of a formula of $A_{1-z}C_zB_xAl_{12-y}O_{19-\alpha}$ which is a partial substitution of the element A of the above $AB_xAl_{12-y}O_{19-\alpha}$ composition by an element C (C is K and/or Rb and/or rare earth element).

Thus, the inventors proposed a catalyst carrier consisting essentially of $MeO \cdot 6Al_2O_3$ composition and a catalyst carried on such carrier, and a catalyst having a layered aluminate structure like that of $MeO \cdot 6Al_2O_3$. Further, the inventors suggested in the above applications that the catalyst activities at low temperatures can be improved by carrying a noble metal on the catalyst carrier surface by means of impregnation, etc.

A conventional noble metal catalyst wherein a noble metal catalyst component is supported by impregnation on a surface of a catalyst carrier such as γ-alumina carrier, silica-alumina carrier, etc. shows a superior low temperature activity when it is used as a catalyst for a catalytic combustion reaction, etc. However, if it is used at a high temperature exceeding 800° C., γ-alumina is transformed into α-alumina and sintering of a noble metal catalyst component occurs, so that the catalyst activity, especially at low temperatures, decreases rapidly. Therefore, the inventors made many efforts in developing a heat resistant carrier and a heat-resistant heavy metal catalyst having an activity comparable to a noble metal catalyst. In making such efforts, a catalyst has been earnestly desired which has a higher activity at any temperature range of low, middle and high and still has a superior heat-resistant property.

SUMMARY OF THE INVENTION

Therefore, an object of the present invention is to meet the above desire and to provide a noble metal catalyst having an especially high activity and a superior heat-resistant property.

The inventors have made many extensive studies to obtain such catalyst leading to the present invention to find out that an extremely highly active and heat-resistant catalyst is obtained by providing a special complex of a catalyst component including a noble metal and catalyst carrier components.

The present invention is a heat-resistant noble metal catalyst consisting essentially of a composition having a formula $A_{1-z}C_zB_xD_uAl_{12-y-u}O_{19-\alpha}$, wherein A is at least one element selected from the group consisting of Ba, Ca and Sr; C is at least one element selected from the group consisting of K, Rb and rare earth elements, B is at least one element selected from the group consisting of Mn, Co, Fe, Ni, Cu and Cr, D is at least one element selected from the group consisting of Au, Ag and platinum group noble metals, z is a value in a range of 0–about 0.4, x is a value in a range of 0–about 4, y is a value in a range of x–2x, u is a value of not less than about 0.01, x+u is a value of not more than about 4, and α is a value which is determined by the valences X, Y, Z and U of the respective elements A, C, B and D and the values of x, y, z and u and is expressed as $$\alpha = 1 - \frac{1}{2}\{X - z(X-Y) + xZ + uU - 3y - 3u\}.$$

The noble metal catalyst of the present invention is suitable especially for catalytic combustion reaction processes, but is not limited to such use, and is usable in all other catalytic reactions requiring high temperatures. Namely, the catalyst of the present invention can be used in a vast variety of reactions using a noble metal catalyst, such as selective hydrogenation of acetylenes, epoxidation of olefines, deodorization, and abatement of nitrogen oxides, as a noble metal catalyst having a stable high activity.

The present invention provides also a method of producing a heat-resistant noble metal catalyst comprising, dissolving and mixing a water soluble and/or alcohol soluble aluminum compound, a water soluble and- /or an alcohol soluble compound of an element A selected from the group consisting of Ca, Ba and Sr, a water soluble and/or alcohol soluble compound of an element C selected from the group consisting of K, Rb and rare earth elements, a water soluble and/or alcohol soluble compound of an element B selected from the group consisting of Mn, Co, Fe, Ni, Cu and Cr, and a water soluble and/or alcohol soluble compound of an element D selected from the group consisting of Au, Ag and platinum group noble metals in an atomic ratio of (Al+B+D):(A+C):(B+D):B=100:(7-10):(0.08-33.3):(0-33.2), obtaining a precipitation, hydrolysis and/or thermal decomposition product in the solution, removing the product from the solution, and calcining the product at a temperature of not less than about 900° C.

Preferably, the method of the present invention is carried into effect by using complexed and/or mixed alkoxides of aluminum and the element A, as a starting raw material. By this alkoxide method, a highly active and heat-resistant noble metal catalyst can be obtained which is superior to those obtained by the impregnation method, solids mixing method, precipitation method from aqueous solution, and other methods used for preparation of usual catalysts and catalyst carriers.

When the summed amount of the elements A and C in the heat-resistant noble metal catalyst of the present invention is 8.3 atoms relative to 100 atoms of a summed amount of the elements B, D and Al, the $A_{1-z}C_zB_xD_uAl_{12-y-u}O_{19-\alpha}$ composition takes the most stable structure having a superior heat-resistant and stable property. However, a summed amount of the elements A+C is not limited to this ratio, and the atomic ratio of (A+C):(B+D+Al) is desirably in a range of about (7-10):100, and more desirably approximately 8.3:100. If the summed amount of the elements A+C exceeds this range, AO or AO·Al₂O₃ phases in the catalyst become excessively large. If the summed amount of the elements A+C is smaller than this range, Al₂O₃ phase in the catalyst becomes also excessively large. These oxides cause sinterings at high temperatures to decrease the specific surface area of the catalyst, and hence decrease the catalyst activity.

An unnecessary large value of z representing an amount of the element C in the $A_{1-z}C_zB_xD_uAl_{12-y-u}O_{19-\alpha}$ composition is not desirable, because it causes decrease of the catalyst activity and deterioration of the heat-resistant property of the catalyst. The value of z is desirably in a range of 0–about 0.4.

The value of (x+u) which shows a sum of the active components B and D in the $A_{1-z}C_zB_xD_uAl_{12-y-u}O_{19-\alpha}$ composition is desirably in a range of about 0.01–4 and especially about 0.02–3. If the value u is less than about 0.01, catalyst activity is not sufficiently exhibited due to deficiency of the active component D. If the value (x+u) exceeds about 4, the active elements B and D can not be entered sufficiently into the layered aluminate structure of the $A_{1-z}C_zB_xD_uAl_{12-y-u}O_{19-\alpha}$ composition, and the excess elements B and D left form single oxides and are deposited on the surface of the catalyst, and cause sinterings to decrease the catalyst activity. The inventors consider that the $A_{1-z}C_zB_xD_uAl_{12-y-u}O_{19-\alpha}$ composition which is the essential component of the heat-resistant noble metal catalyst of the present invention has a layered aluminate structure like the magnetoplumbite structure of BaO·6Al₂O₃ and β-alumina structure, based on an analytical result by X-ray diffractions, and that this specific structure imparts the superior heat-resistant property to the catalyst of the present invention.

The heat-resistant catalyst of the present invention can comprise a small amount of a third component, such as silica, alkali metal oxides and other metal oxide affording a heat-resistant property, in addition to alumina, and oxides of the elements A, C, B and D which compose the $A_{1-z}C_zB_xD_uAl_{12-y-u}O_{19-\alpha}$ composition.

The essential $A_{1-z}C_zB_xD_uAl_{12-y-u}O_{19-\alpha}$ composition in the heat-resistant noble metal catalyst of the present invention is a complexed oxide of five oxides, that is, an oxide of the element A, an oxide of the element C, an oxide of the element B, an oxide of the element D, and aluminum oxide. These oxides will be explained respectively, hereinbelow.

As a starting material for aluminum oxide used as main component of the carrier for producing the heat-resistant catalyst of the present invention, preferably use is made of alumina generally known as transition alumina, when using a solids mixing method for producing the heat-resistant catalyst. When using a precipitation method for producing the heat-resistant catalyst, aluminum nitrate, aluminum sulfate, sodium aluminate or other water soluble aluminum compounds can be used as a starting material for aluminum oxide.

As a starting material for oxides of the elements A and C which impart the heat-resistant property to the catalyst of the present invention, various kinds of compounds such as oxide, hydroxide, carbonate, nitrate and sulfate of the elements A and C can be used. Hereinafter, though the explanation will be made mainly taking Ba as an example of the element A and K as an example of the element C, the same applies to Ca and Sr as the element A, and Rb and rare earth elements as the element C.

As a starting material for metal oxide of the element B, which is an active component of the heat-resistant catalyst of the present invention, any compounds generally used as raw materials for producing catalysts can be used, such as oxide, hydroxide, carbonate, nitrate, sulfate, chloride, salt of organic acid like acetate and ammine complex salt of the element B, and further acid of the element B and its salts such as chromic anhydride, manganate and chromate. In the case of the catalyst of the present invention, the B is preferably Mn, Fe, Ni, Co, Cu and/or Cr, and more preferably Mn and/or Co. Hereinafter, though the explanation will be made mainly taking Co as an example of the element B, the same applies to Mn, Fe, Ni, Cu and Cr.

As a starting material for oxide of the element D, which is an active noble metal component of the heat-resistant catalyst of the present invention, any compounds generally used as raw materials for producing noble metal catalysts can be used, such as salt of inorganic acid like nitrate, salt of organic acid like acetate, halogen compound like chloride, complex salt containing halogen, and other complex salt like ammine complex salt and complex cyanide. Hereinafter, though the explanation will be made mainly taking Pd as an example of the element D, the same applies to other platinum group elements like Pt and Rh, Au and Ag.

For producing the catalyst from those aluminum compounds, barium compounds, potassium compounds, cobalt compounds and palladium compounds, various methods generally used for preparation of catalysts and catalyst carriers can be used, such as coprecipitation, solids mixing, kneading and impregnation methods.

In the present invention, a specific preparation method, a so called alkoxide method, is proposed as the most preferable method for producing the heat-resistant catalyst of this invention. As starting materials of aluminum oxide and barium oxide for this alkoxide method, various alkoxides of aluminum and barium can be used. However, as a starting material for barium oxide, a water soluble barium compound such as barium nitrate can be used in some cases in lieu of alkoxides.

As these alkoxides, alkoxides of 1–4 carbon atoms, such as methoxide, ethoxide, isopropoxide and butoxide, are preferable. Commercial alkoxides can be used, but those alkoxides produced by using aluminum and/or barium metal and alcohols can also be used.

The heat-resistant noble metal catalyst of the present invention can be used in a powder form and in any shapes such as tablet, ring, sphere, extrusion, honeycomb, foam or other shapes generally used in catalysts. In case of honeycomb catalyst or foam catalyst, the entire catalyst can be made of the heat-resistant catalyst composition of the present invention, however, it is also possible to coat the heat-resistant catalyst composition onto a surface of a honeycomb or foam carrier body composed of an inactive material, such as cordierite, etc.

In general, the heat-resistant catalyst of the present invention is processed to the finished product through intermediate and/or final steps of drying and calcination, but the calcination step is not always necessary and may be omitted, as the case may be. If the heat-resistant catalyst is used as a catalyst for high temperature reaction, especially for catalytic combustion, the calcination is an important production step for obtaining the heat-resistant or thermally stabilized catalyst. For example, when the heat-resistant noble metal catalyst is a catalyst for a high temperature catalytic combustion process, it is naturally expected that the catalyst is exposed to a temperature higher than 1,300° C. during usage thereof in the process. For dealing with such situation, the catalyst is preferably produced through calcination at a temperature of 1,300° C. or exceeding 1,300° C. At such high calcination temperature, an alumina component in any catalyst carrier other than that of the present invention, such as $\gamma$-alumina carrier, silica-alumina carrier and alumina carriers containing rare earth element, alkali metal or other heat resistivity improving agent, undergoes a transition to $\alpha$-alumina phase followed by unavoidable remarkable decrease of specific surface area, sintering of noble metal components and accompanying decrease of the activity, especially of low temperature activity, of the catalysts using these carriers.

In producing the heat-resistant noble metal catalyst of the present invention, it is usually preferable to calcine at a temperature of 900° C. or more. If the calcination is effected at a temperature exceeding 1,300° C., it is necessary to measure a corresponding relation between calcination temperature and specific surface area beforehand, and select suitable calcination conditions to obtain a suitable range of specific surface area of the catalyst. To be safe, in the case of a catalyst for a catalytic combustion process, the calcination temperature is selected such that the specific surface area is not less than about 2 $m^2/g$.

The heat-resistant noble metal catalyst of the present invention can be produced by a solids mixing method in which each solid raw material is pulverized, mixed and/or kneaded, but more preferably it is produced by mixing a water soluble aluminum compound, a water soluble barium compound, a water soluble potassium compound, a water soluble cobalt compound, and a water soluble palladium compound in water in an atomic ratio of (Al+Co+Pd):(Ba+K):(Co+Pd):Co of 100:(7–10):(0.08–33.3):(0–33.2), adding a co-precipitating agent or coprecipitant to the aqueous solution to produce a mixed composition in a form of coprecipitate, removing impurities and water by washing and filtering or evaporating to dryness, precalcining the coprecipitate at about 200°–500° C, and calcining the precalcined coprecipitate at a temperature of about 900°–1,500° C. for about 5–30 hours. As the water soluble aluminum compound in this case, aluminum nitrate, aluminum sulfate, aluminum chloride, etc., can be used. As the water soluble barium compound, barium nitrate, barium chloride, etc., can be used. As the water soluble potassium compound, potassium nitrate, potassium sulfate, potassium chloride, etc., can be used. As the water soluble cobalt compound, cobalt nitrate, cobalt sulfate, cobalt chloride, etc., can be used. As the water soluble palladium compound, palladium nitrate, palladium chloride, etc., can be used. As the coprecipitant in this case, sodium hydroxide, sodium carbonate, caustic potash, and aqueous ammonia, etc., can be used.

As the water soluble starting materials, basic salt such as sodium aluminate, barium hydroxide, potassium hydroxide, permanganate, cobalt ammine complex salt, and palladium ammine complex salt, etc., can also be used. In this case, acidic coprecipitant such as nitric acid or carbonic acid should be used.

In the more preferred alkoxide method, formation of the oxides of aluminum and barium from their alkoxides is preferably effected through their hydrolysis reactions. As a way of adding the other components to the catalyst, there is a preferable way of adding an aqueous solution of the other components to the mixed alkoxides of aluminum and barium simultaneously with the addition of the water necessary for the hydrolysis of the alkoxides.

Formation of the oxides of aluminum and barium from their alkoxides can be effected not only by hydrolysis but also by other processes such as thermal decomposition, etc. It is not necessary that all of these oxides are prepared from the corresponding alkoxides. For example, alumina, barium carbonate, etc. can be added to the decomposition product of the alkoxides.

The hydrolysis reaction is more preferably effected at about 50°–100° C. than at room temperature. The effect of the pH of water added for the hydrolysis reaction is not noticeable. But, the effect of aging time after the addition of water on a specific surface area of the heat-resistant catalyst is quite large. The longer the aging time, the higher the specific surface area. Thus, aging time is preferably at least one hour, and more preferably as long as possible, such as 5–10 hours within the economically permissible extent. The inventors have found out that specific surface area of the heat-resistant catalyst is influenced by an amount of water used in the hydrolysis, and that unexpectedly large specific surface area can be obtained even when the amount of water used in the hydrolysis is less than the amount of water necessary for hydrolyzing all the amount of existing alkoxides into hydroxides and alcohols (hereinafter, abbreviated as "equivalent amount of water"). Thus, the amount of water for the hydrolysis can be less than the equivalent amount of water. However, less than 0.5 equivalent amount of water is not preferable, because specific surface area of the produced heat-resistant catalyst decreases rapidly. Therefore, at least about 0.5 equivalent amount of water is preferable. On the other hand, use of an unnecessarily large amount of water in the hydrolysis is not preferable, because it causes an excessive investment cost and energy consumption, so that water amount is preferably equal to or less than about 10 equivalent amount of water from an economical viewpoint. Therefore, generally an amount of water to be used is about 0.5-10 equivalent amount of water. But, the amount of water is not exclusively limited to this range, if some extent of uneconomical results are permissible.

This alkoxide method is not limited exclusively to the above embodiment which uses mixed or complexed alkoxide of aluminum and barium as the starting material alkoxide, and includes many other modifications. For example, in another embodiment, aluminum alkoxide is only used as the starting material alkoxide without using barium alkoxide. In another embodiment, mixed or complexed alkoxides of aluminum, barium and cobalt are used as the starting material alkoxide, for example. Also in these embodiments the remaining components of the catalyst are preferably used in the form of aqueous solution of these compounds and added to the alkoxide simultaneously with the addition of the water necessary for the hydrolysis.

In a preferred embodiment of the alkoxide method, the heat-resistant noble metal catalyst of the present invention is produced by dissolving aluminum alkoxide and barium alkoxide in an alcohol, adding an aqueous solution of cobalt nitrate, potassium nitrate and palladium nitrate in an about 0.5-10 equivalent amount of water to the alcoholic solution of the alkoxides, hydrolyzing the mixed solution at a temperature of 50°-100° C., aging the hydrolyzed solution for 5-10 hours, removing the solvent by evaporation to dryness, etc., to obtain a decomposed product, precalcining the decomposed product at a temperature of about 200°-500° C., and calcining the precalcined product at a temperature of not less than 900° C. for about 5-30 hrs.

The raw materials are used in such amounts that atomic ratio of Al, K, Co and Pd contained in the raw materials becomes (Al+Co+Pd):(Ba+K):(Co+Pd):Co=100:(7-10):(0.08-33.2):(0-33.2).

The precalcination step may be dispersed with, as the case may be.

Increase of the heat-resistant property of the heat-resistant noble metal catalyst of the present invention is considered to be due to the formation of heat-resistant complexed oxides composition $A_{1-z}C_zB_xD_uAl_{12-y-u}O_{19-\alpha}$ which has a layered aluminate crystal structure, in which the active elements C and/or D are incorporated or fixed in the crystal lattice. Namely, in the heat-resistant noble metal catalyst of the present invention, a stable layered aluminate crystal structure $A_{1-z}C_zB_xD_uAl_{12-y-u}O_{19-\alpha}$ is formed at a relatively low temperature not higher than a transformation temperature of transition alumina to $\alpha$-alumina, which can prevent alumina from transformation to $\alpha$-alumina and sintering, and afford a good retention of the specific surface area and the activity at high temperatures.

DESCRIPTION OF THE PREFERRED EMBODIMENTS

Hereinafter, the present invention will be explained in further detail by referring to examples.

EXAMPLE 1

Commercial aluminum isopropoxide and metallic barium are dissolved in isopropyl alcohol at 80° C. for 5 hours in nitrogen atmosphere. Then, droplets of an aqueous solution of palladium chloride are added to the solution to effect hydrolysis thereof. After 12 hours of aging, the resulted suspension is dried at reduced pressure at 80° C., precalcined at 500° C., and calcined at 1,200° C. for 5 hours to obtain a catalyst of Example 1. The catalyst has a composition of $BaPd_{0.05}Al_{11.95}O_{19-\alpha}$. BET Specific surface area of the catalyst of Example 1 is 12.5 m²/g.

REFERENTIAL EXAMPLE 1

Aluminum isopropoxide and metallic barium are dissolved in isopropyl alcohol at 80° C. for 5 hrs in nitrogen atmosphere. Then, droplets of water are added to the solution to effect hydrolysis thereof. After 12 hrs of aging, the resulting suspension is dried at reduced pressure at 80° C., precalcined at 500° C., and calcined at 1,300° C. for 5 hrs to obtain a catalyst carrier. The catalyst carrier is then impregnated with an aqueous solution of palladium chloride, and calcined at 1,200° C. for 5 hrs to obtain a catalyst of Referential Example 1. Supported amount of palladium is 5 g per 1 liter of the catalyst carrier. This catalyst has about 0.5 wt % of palladium supported on the surface of $BaO \cdot 6Al_2O_3$ carrier. BET specific surface area of the catalyst of Referential Example 1 is 9.8 m²/g.

USE EXAMPLE 1

The catalysts of Example 1 and Referential Example 1 are used individually in a fixed bed flow type reactor of ambient pressure to measure their activities in a methane combustion test. The gas used in the test consists of 2 vol % of methane and 99 vol % of air, and was fed to the catalyst bed of the reactor at a space velocity of 100,000 hr$^{-1}$.

The results of the activity test are shown in the following Table 1.

TABLE 1

| Catalyst | Composition | BET specific surface area (m²/g) | $T_{conv}$ Y% Immediate after start | | $T_{conv}$ Y% After 1200° C. × 1000 hrs | |
|---|---|---|---|---|---|---|
| | | | Y = 10 | Y = 90 | Y = 10 | Y = 90 |
| Example 1 | $BaPd_{0.05}Al_{11.95}O_{19-\alpha}$ | 12.5 | 630 | 685 | 450 | 630 |
| Referential Example 1 | 0.5%Pd/BaO.6Al₂O₃ | 9.8 | 425 | 660 | 560 | 670 |

Note: $T_{conv}$ Y% is a temperature at which methane conversion rate is Y%.

Catalyst of Referential Example 1 in which palladium is supported on a heat-resistant carrier $BaO \cdot 6Al_2O_3$ by an impregnation method exhibits a superior activity immediately after the start of the test, but its activity, especially at a low temperature range, decreases rapidly when the test is continued at high temperatures. On the other hand, the catalyst of Example 1 in which palladium is incorporated and fixed in the layered aluminate crystal structure of BaO·6Al$_2$O$_3$ exhibits a lower activity at the beginning of the test, but the activity is improved rapidly during the test, and there is substantially no decrease of the activity even when the test is continued at high temperatures.

EXAMPLE 2

The catalyst of Example 2 is produced by the same manner as in Example 1, except that the amount of palladium used is varied. The composition of this catalyst is BaPd$_{0.5}$Al$_{11.5}$O$_{19-\alpha}$, and BET specific surface area is 9.1 m$^2$/g.

EXAMPLES 3, 4 AND 5

A solution of aluminum isopropoxide in alcohol is mixed with droplets of an aqueous mixed solution of strontium nitrate, lanthanum nitrate and palladium chloride, an aqueous mixed solution of barium nitrate, palladium chloride and manganese nitrate, or an aqueous mixed solution of strontium nitrate, lanthanum nitrate, palladium chloride and manganese nitrate, individually to effect hydrolysis, to obtain the three catalysts of Examples 3, 4 and 5. Compositions of these catalysts are Sr$_{0.8}$La$_{0.2}$Pd$_{0.5}$Al$_{11.5}$O$_{19-\alpha}$, BaPd$_{0.25}$Mn$_{0.75}$Al$_{11}$O$_{19-\alpha}$, and Sr$_{0.8}$La$_{0.2}$Pd$_{0.25}$Mn$_{0.75}$Al$_{11}$O$_{19-\alpha}$, respectively.

USE EXAMPLE 2

The catalysts of Examples 2, 3, 4 and 5 are used in the same methane combustion activity test as in Use Example 1 to measure their activities. The results are shown in the following Table 2.

TABLE 1

| Catalyst | Composition | BET specific surface area (m$^2$/g) | T$_{conv}$ Y% Immediate after start Y = 10 | Y = 90 | After 1200° C. × 1000 hrs Y = 10 | Y = 90 |
|---|---|---|---|---|---|---|
| Example 2 | BaPd$_{0.5}$Al$_{11.5}$O$_{19-\alpha}$ | 9.1 | 640 | 670 | 400 | 650 |
| Example 3 | Sr$_{0.8}$La$_{0.2}$Pd$_{0.5}$Al$_{11.5}$O$_{19-\alpha}$ | 11.2 | 635 | 660 | 420 | 640 |
| Example 4 | BaPd$_{0.25}$Mn$_{0.75}$Al$_{11}$O$_{19-\alpha}$ | 12.7 | 560 | 650 | 460 | 635 |
| Example 5 | Sr$_{0.8}$La$_{0.2}$Pd$_{0.25}$Mn$_{0.75}$Al$_{11}$O$_{19-\alpha}$ | 10.5 | 570 | 645 | 430 | 620 |

As seen clearly from the foregoing, the present invention provides a heat-resistant noble metal catalyst having an exceedingly superior heat-resistant property and a remarkable high activity at any temperature ranges, so that it is eminently useful in the industry.

Though the present invention has been described with specific examples and numeral values, it is of course apparent to those skilled in the art that various changes and modifications thereof are possible without departing from the broad spirit and aspect of the present invention as hereinafter claimed.

What is claimed is:

1. A heat-resistant noble metal catalyst consisting essentially of a composition having a formula A$_{1-z}$C$_z$B$_x$D$_u$Al$_{12-y-u}$O$_{19-\alpha}$, wherein A is at least one element selected from the group consisting of Ba, Ca and Sr, C is at least one element selected from the group consisting of K, Rb and rare earth elements, B is at least one element selected from the group consisting of Mn, Co, Fe, Ni, Cu and Cr, D is at least one element selected from the group consisting of Au, Ag and platinum group noble metals, z is a value in a range of 0–about 0.4, x is a value in a range of 0–about 4, y is a value in a range of x–2x, u is a value of not less than about 0.01, x+u is a value of not more than about 4, and $\alpha$ is a value which is determined by the valences X, Y, Z and U of the respective element A, C, B and D and the values of x, y, z and u and is expressed as $$\alpha = 1 - \tfrac{1}{2}\{X - z(X-Y) + xZ + uU - 3y - 3u\}.$$

2. A heat-resistant noble metal catalyst as defined in claim 1, wherein the atomic ratio of the sum of elements A and C to the sum of elements B, D and Al is in a range of about (7–10):100.

3. A heat-resistant noble metal catalyst as defined in claim 1, wherein a part or whole of the Al or a part or whole of the elements A and Al in the composition A$_{1-z}$C$_z$B$_x$D$_u$Al$_{12-y-u}$O$_{19-\alpha}$ is a decomposition product of alkoxides of these elements.

4. A heat-resistant noble metal catalyst as defined in claim 3, wherein the decomposition product of the alkoxides is a hydrolysis product or heat decomposition product of the alkoxides.

5. A heat-resistant noble metal catalyst as defined in claim 3, wherein the alkoxides have 1–4 carbon atoms.

6. A heat-resistant noble metal catalyst as defined in claim 1, wherein a part or whole of the composition having the formula A$_{1-z}$C$_z$B$_x$D$_u$Al$_{12-y-u}$O$_{19-\alpha}$ is a layered aluminate crystal structure in which active elements B and D are incorporated and fixed in a crystal lattice of the crystal structure.

7. A heat-resistant noble metal catalyst as defined in claim 1, which is used as a catalyst in a catalytic combustion process.

8. A method of producing a heat-resistant noble metal catalyst comprising dissolving and mixing a water soluble and/or alcohol soluble aluminum compound, a water soluble and/or alcohol soluble compound of an element A selected from the group consisting of Ca, Ba and Sr, a water soluble and/or alcohol soluble compound of an element C selected from the group consisting of K, Rb and rare earth elements, a water soluble and/or alcohol soluble compound of an element B selected from the group consisting of Mn, Co, Fe, Ni, Cu and Cr; and a water soluble and/or alcohol soluble compound of an element D selected from the group consisting of Au, Ag and platinum group noble metals in an atomic ratio of (Al+B+D):(A+C):(B+D):B=100:(7–10):(0.08–33.3):(0–33.2), obtaining a precipitation, hydrolysis and/or thermal decomposition product in the solution, removing the product from the solution, and calcining the product at a temperature of not less than about 900° C.

9. A method of producing the catalyst as defined in claim 8, wherein the hydrolysis product is obtained by hydrolysis of complexed and/or mixed alkoxides of aluminum alkoxide and alkoxide of the element A using an aqueous solution of compounds of the elements C, B and D.

10. A method of producing the catalyst as defined in claim 8, wherein the hydrolysis product is obtained by hydrolysis of aluminum alkoxide using an aqueous solution of compounds of the elements A, C, B and D.

11. A method of producing the catalyst as defined in claim 8, wherein the alkoxides have 1-4 carbon atoms.

12. A method of producing the catalyst as defined in claim 8, wherein the amount of water used for the hydrolysis is at least about 0.5 equivalent amount of water necessary for hydrolyzing all the amounts of the alkoxides.

13. A method of producing the catalyst as defined in claim 8, wherein the hydrolysis is effected at a temperature of about 50°-100° C.

14. A method of producing the catalyst as defined in claim 8, wherein an aging is effected for at least about 1 hr after the addition of water for the hydrolysis.

* * * * *